United States Patent
Yang et al.

(10) Patent No.: US 10,120,795 B2
(45) Date of Patent: Nov. 6, 2018

(54) WEAR-LEVELING NANDFLASH MEMORY READING/WRITING METHOD

(71) Applicant: Institute of Geology and Geophysics, Chinese Academy of Sciences, Beijing (CN)

(72) Inventors: Yongyou Yang, Beijing (CN); Wenxuan Chen, Beijing (CN); Qingyun Di, Beijing (CN); Wenxiu Zhang, Beijing (CN); Yuntao Sun, Beijing (CN); Jian Zheng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/699,763

(22) Filed: Sep. 8, 2017

(65) Prior Publication Data
US 2018/0081797 A1   Mar. 22, 2018

(30) Foreign Application Priority Data
Sep. 21, 2016   (CN) .......................... 2016 1 0838881

(51) Int. Cl.
*G06F 12/02*   (2006.01)
*G06F 12/126*   (2016.01)

(52) U.S. Cl.
CPC ...... *G06F 12/0246* (2013.01); *G06F 12/0292* (2013.01); *G06F 12/126* (2013.01); *G06F 2212/7211* (2013.01)

(58) Field of Classification Search
CPC . G06F 12/0246; G06F 12/0292; G06F 12/126
See application file for complete search history.

(56) References Cited

U.S. PATENT DOCUMENTS

| | | | |
|---|---|---|---|
| 5,809,558 A * | 9/1998 | Matthews | G06F 12/0246 707/999.202 |
| 7,096,313 B1 | 8/2006 | Chang et al. | |
| 7,762,854 B1 | 7/2010 | Peng | |
| 2001/0012703 A1 | 8/2001 | Wurm et al. | |
| 2002/0075114 A1 | 6/2002 | Hall et al. | |

(Continued)

FOREIGN PATENT DOCUMENTS

| CN | 1740746 A | 3/2006 |
|---|---|---|
| CN | 2849164 Y | 12/2006 |

(Continued)

*Primary Examiner* — Ryan Bertram
(74) *Attorney, Agent, or Firm* — Novick, Kim & Lee, PLLC; Allen Xue

(57) ABSTRACT

A wear-leveling NandFlash memory reading/writing method can identify a bad block, avoid the bad block, and equalize writing operations to ensure that all the blocks are identical in number of the writing operations so as to guarantee wear-leveling NandFlash memory reading and writing of the entire memory. This method has characteristics of low computational and small RAM cost, is suitable for the application scenario like operating a single file for a long time with an imbedded system with low cost and poor hardware resource, and can provide a complete file system solution.

6 Claims, 4 Drawing Sheets

(56) References Cited

U.S. PATENT DOCUMENTS

| | | | |
|---|---|---|---|
| 2007/0143560 A1* | 6/2007 | Gorobets | G06F 12/0246 |
| | | | 711/170 |
| 2007/0247329 A1 | 10/2007 | Petrovic et al. | |
| 2008/0086631 A1* | 4/2008 | Chow | G06F 8/665 |
| | | | 713/2 |
| 2009/0023502 A1 | 1/2009 | Koger | |
| 2009/0153355 A1 | 6/2009 | Price et al. | |
| 2011/0231597 A1* | 9/2011 | Lai | G06F 12/0246 |
| | | | 711/103 |
| 2012/0249338 A1 | 10/2012 | Merino | |
| 2012/0299743 A1 | 11/2012 | Price et al. | |
| 2013/0019049 A1* | 1/2013 | Yeh | G06F 12/0246 |
| | | | 711/103 |
| 2014/0332235 A1 | 11/2014 | Mueller et al. | |
| 2017/0039135 A1* | 2/2017 | Peddle | G06F 13/28 |

FOREIGN PATENT DOCUMENTS

| | | |
|---|---|---|
| CN | 101289935 A | 10/2008 |
| CN | 201221354 Y | 4/2009 |
| CN | 101493008 A | 7/2009 |
| CN | 102418516 A | 4/2012 |
| CN | 202187758 U | 4/2012 |
| CN | 103061755 A | 4/2013 |
| CN | 103577121 A | 2/2014 |
| CN | 204283400 U | 4/2015 |
| CN | 204283413 U | 4/2015 |
| CN | 105353357 A | 2/2016 |
| CN | 105760113 A | 7/2016 |
| CN | 105804722 A | 7/2016 |
| CN | 206299372 U | 7/2017 |
| CN | 206299375 U | 7/2017 |

* cited by examiner

WEAR-LEVELING NANDFLASH MEMORY READING/WRITING METHOD

TECHNICAL FIELD

The present disclosure relates to a mass storage control technique, and particularly to a wear-leveling NandFlash memory reading/writing method.

BACKGROUND

Most of existing Nandflash reading/writing drivers are set up to accommodate a common file system, for example, support an almost unlimited number of files to be written into a memory, and a file reading/writing format is also a preparation format, and thus such file system drivers often require more hardware and software resources. For instance, a Linux operating system with a YAFFS file system is a well-known, excellent file system capable of perfectly supporting a Nandflash memory. Porting this system requires that a capacity of a RAM is usually one percent of that of the memory. For example, the capacity of the Nandflash memory is 1 GB, the required capacity of the RAM is 10 MB. In addition, a powerful CPU is also required, or else cannot meet requirements for file reading/writing speeds.

There is a class of application systems composed of embedded systems, such as long-term data acquiring and recording instruments, which are long in running time, less in files, and large in capacity of a single file when being started up. Resources of this class of systems are relatively stressed. For instance, the running speed of the CPU reaches tens of MHz, and the capacity of the RAM reaches tens or hundreds of KB. As a result, common standard file drive systems such as a YAFFS may not be ported. A large-capacity data recording system typically uses a NandFlash as a data memory. This memory is subjected to a writing operation with a block as a basic unit, and has a disadvantage of limited number of writing operations, such as 5000 times to 10000 times. At the time of delivery, there may be bad blocks that have already been marked (other blocks of the memory with bad blocks can be still subjected to writing and reading operations), and new bad blocks may be generated in a writing process. Accordingly, when such a memory is read/written, it is necessary to identify the bad block, avoid the bad block, and equalize the writing operations (as much as possible to ensure that all the blocks are consistent in number of the writing operations) to ensure the lifetime of the entire memory.

People have designed a variety of file systems to support reading and writing of the NandFlash, a basic idea of which is to create a mapping table and a data buffer, regularly update a record of the number of the writing operations and a record of bad blocks, and in this way, adjust a position of a block where data is written. When data starts to be written, the data is buffered in the buffer, and then written into the NandFlash after the preceding determination is completed.

SUMMARY

In order to solve the above technical problem, the disclosure provides a wear-leveling NandFlash memory reading/writing method capable of identifying a bad block, avoiding the bad block, and equalizing writing operations to ensure that all the blocks are consistent in number of the writing operations so as to guarantee the lifetime of the entire memory.

A technical solution of the present invention is as follows: a wear-leveling NandFlash memory reading/writing method specifically includes:

a writing step, including the following sub-steps:

(1a) creating a new file information table in a NandFlash address space, and reading all other file information tables to determine a writing starting address of a new file;

(2a) determining whether the writing starting address of the file is in a starting address of a block or not, if the writing starting address of the file is in the starting address of the block, erasing it, determining a return status of an erasure operation; if an error is returned, indicating that this block is a bad block, finding a block in a swap area to replace it, and updating a bad block registration table;

(3a) storing to-be-written data into a data buffer of a memory, if content of one page has been stored sufficiently, writing it into the memory (filled with one page once), determining a return status of a writing operation, if an error is returned, indicating that the block where this page is located is a bad block, finding a block in a swap area to replace it, updating the bad block registration table, and copying contents of a current page and its previous page of the bad block into a new block;

(4a) after the pages are written successfully, updating the file information table, which includes starting and ending addresses of file storage, file sizes and file updating time;

(5a) repeating step (3a) until a user ends the writing operation, checking whether any remaining data exists in the data buffer or not, if any remaining data exists in the data buffer, writing all the data in the buffer into the memory (contents, which are not filled completely, of the buffer are filled with specific bytes); and (6a) updating the file information table, and ending the file writing operation; and a reading step, including the following sub-steps:

(1b) reading the file information table, and determining a starting address and an ending address of file storage;

(2b) determining whether the starting address is an address of a new block or not, if the starting address is the address of the new block, executing step (3b), and otherwise, executing step (4b);

(3b) determining whether a to-be-read block is a bad block or not, if the to-be-read block is a bad block, finding the address of its replacement block;

(4b) reading a page of data once, and determining whether the file is completely read or not according to the file information table, if the file is completely read, ending, otherwise, continuing;

(5b) determining whether contents of blocks of all the pages are read or not, if the contents of blocks of all the pages are not read, continuing to perform step (4b) with the next page, otherwise executing step (6b); and (6b) continuing to perform step (3b) with the next block.

Further, the method further includes a file deletion operation, in which the file deletion operation is to delete the record of the to-be-deleted file in the file information table. If there are files stored in front the address of the to-be-deleted files, sequentially copy those files behind the end starting address of the last file, that is, ensure that area addresses where file contents are stored in the data area are coherent.

Further, the method further includes a file addition writing operation, which continues writing at the tail of the file. If there are no other files behind the additionally written file, directly continues the writing, and if there are other files behind the additionally written file, firstly executes a file movement process to move the additionally written file to the tail-most end of a used storage space, and then continues the writing at the tail of the file.

Further, the physical storage space of the NandFlash memory is divided into a storage information area, a file information area, a data area and a swap area;

the storage information area is configured to store a bad block registration swap table and is located behind the file information area, wherein the information storage area is divided into a plurality of small blocks, each of which can store a piece of completely stored information and is used in turn;

the file information area is configured to store a bad file information table and is located in the first several blocks of a physical address of the memory, wherein the file information area is internally divided into a plurality of small blocks, each of which can store a piece of complete file information and is used in turn;

the data area is configured to store a data content itself and is located in the middle of the physical address of the memory; and the swap area is configured to swap a bad block and is located in the last several blocks of the physical address of the memory, wherein if a certain block in the data area can not be written, it is replaced with a block in the swap area.

The present invention has advantageous effects that due to the adoption of the above technical solution, the method of the present invention has characteristics of low computational and small RAM cost, is suitable for the application scenario like operating a single file for a long time with an imbedded system with low cost and poor hardware resource, and can provide a complete file system solution.

DETAILED DESCRIPTION

Embodiments of the present invention will be further described below with reference to accompanying drawings and specific embodiments.

Figure 1:
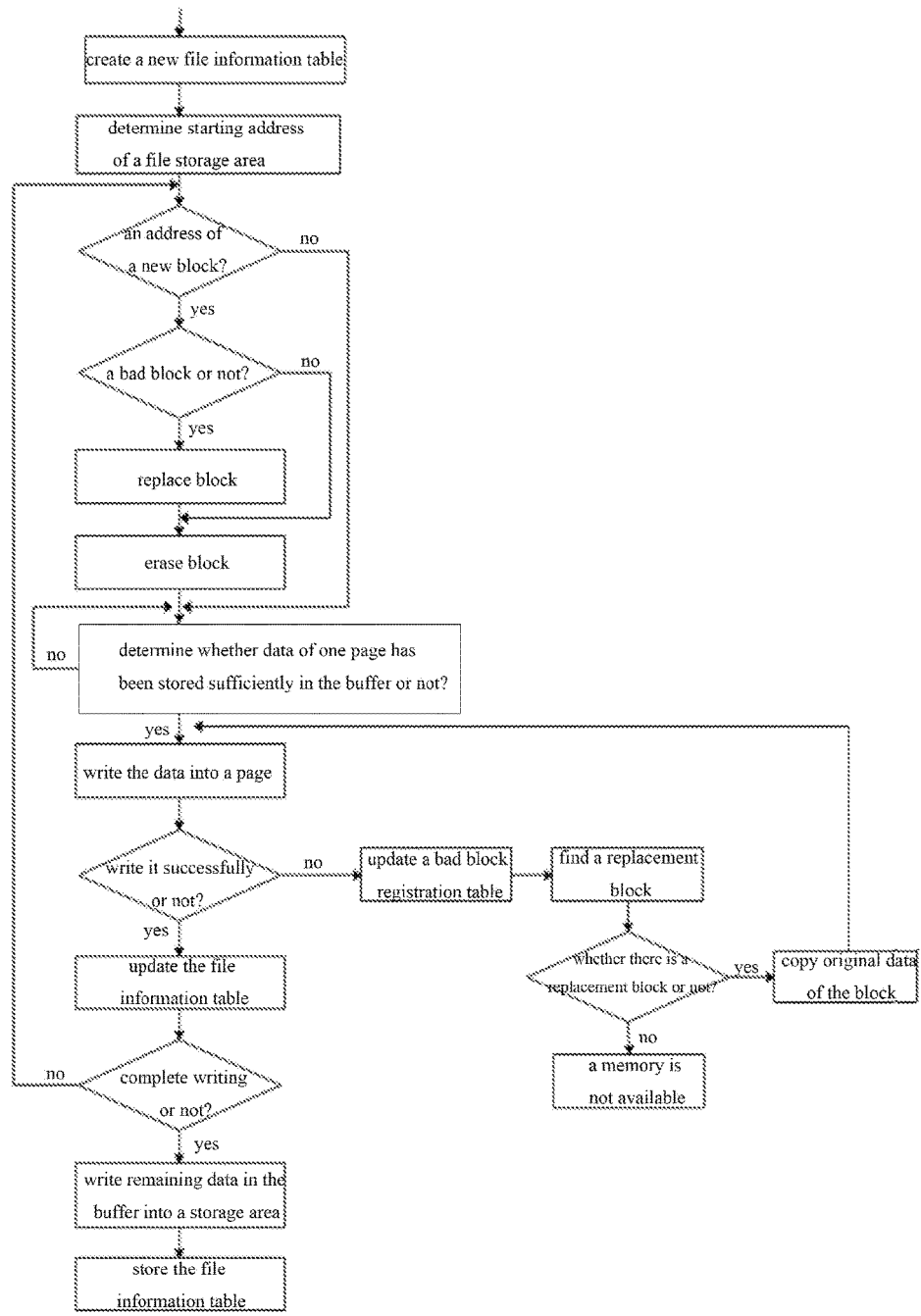
FIG. 1 is a block flow diagram of a file writing method according to the present invention.
Figure 2:
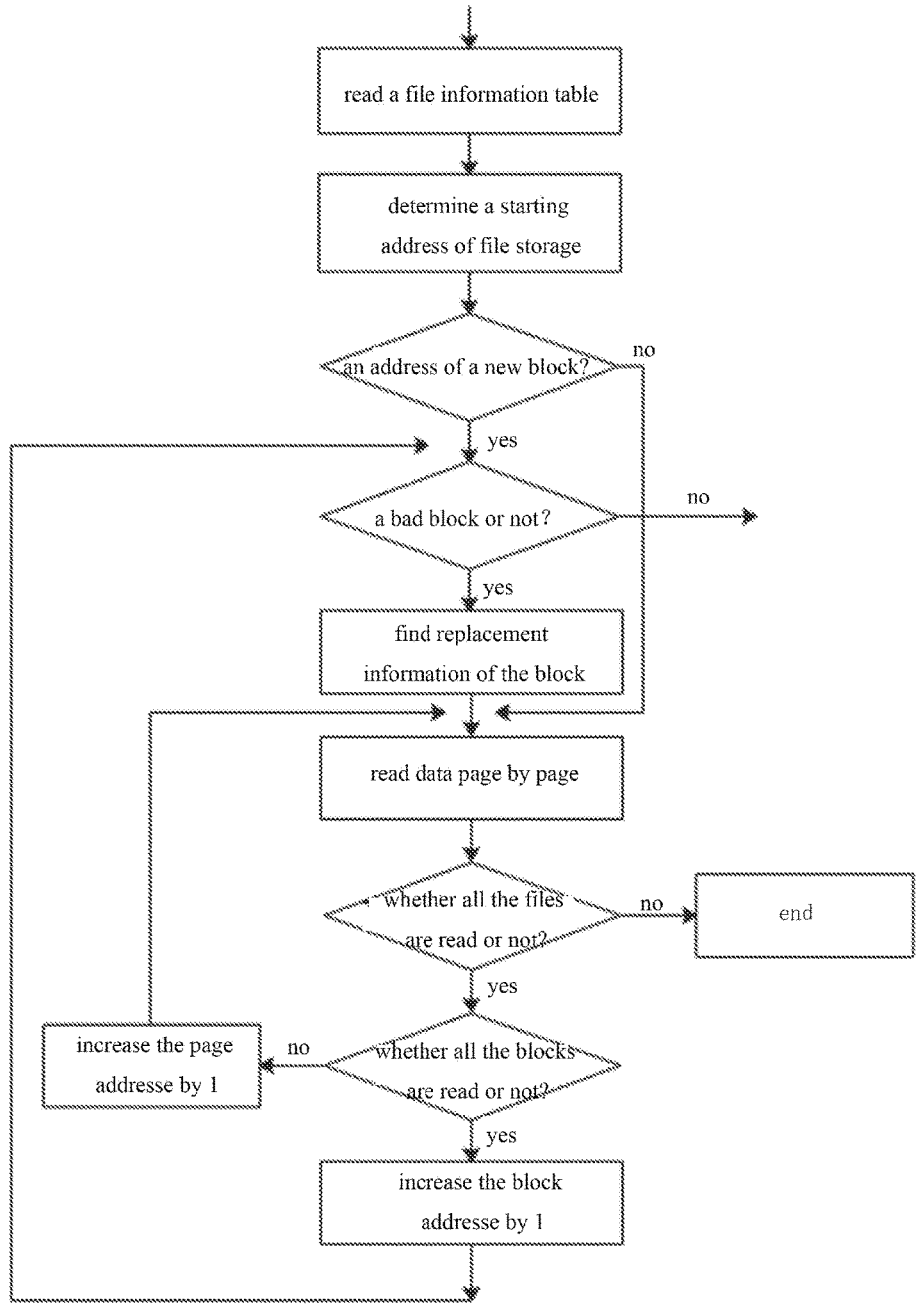
FIG. 2 is a block flow diagram of a file reading method according to the present invention.

As shown in FIG. 1 and FIG. 2, the present disclosure provides a wear-leveling NandFlash memory reading/writing method, specifically including:

a writing step, including the following sub-steps:

(1a) creating a new file information table in a NandFlash address space, and reading all other file information tables to determine a writing starting address of a new file;

(2a) determining whether the file writing starting address is in a starting address of a block or not, if the writing starting address of the file is in the starting address of the block, erasing it, determining a return status of an erasure operation; if an error is returned, indicating that the block is a bad block, finding a block in a swap area to replace it, and updating a bad block registration table;

(3a) storing to-be-written data into a data buffer of a memory, if content of one page has been stored sufficiently, writing it into the memory (filled with one page once), determining a return status of the writing operation, if an error is returned, indicating that the block where this page is located is a bad block, finding a block in a swap area to replace it, updating the bad block registration table, and copying contents of a current page and its previous page of the bad block into a new block;

(4a) after the pages are written successfully, updating the file information table, which includes starting and ending addresses of file storage, file sizes and file updating time;

(5a) repeating step (3a) until a user ends a writing operation, checking whether any remaining data exists in the data buffer or not, if any remaining data exists in the data buffer, writing all the data in the buffer into the memory (contents, which are not filled completely, of the buffer are filled with bytes, such as hexadecimal bytes);

(6a) updating the file information table, and ending the file writing operation; and a reading step, including the following sub-steps:

(1b) reading the file information table, and determining a starting address and an ending address of file storage;

(2b) determining whether the starting address is an address of a new block, if the starting address is the address of the new block, executing step (3b), and otherwise, executing step (4b);

(3b) determining whether a to-be-read block is a bad block or not, if the to-be-read block is the bad block, finding the address of its replacement block;

(4b) reading a page of data once, and determining whether the file is completely read or not according to the file information table, if the file is completely read, ending, otherwise, continuing;

(5b) determining whether contents of blocks of all the pages are read or not, if the contents of the blocks of all the pages are not read, continuing to perform step (4) with the next page, otherwise executing step (6); and (6b) continuing to perform step (3b) with the next block.

Figure 3:
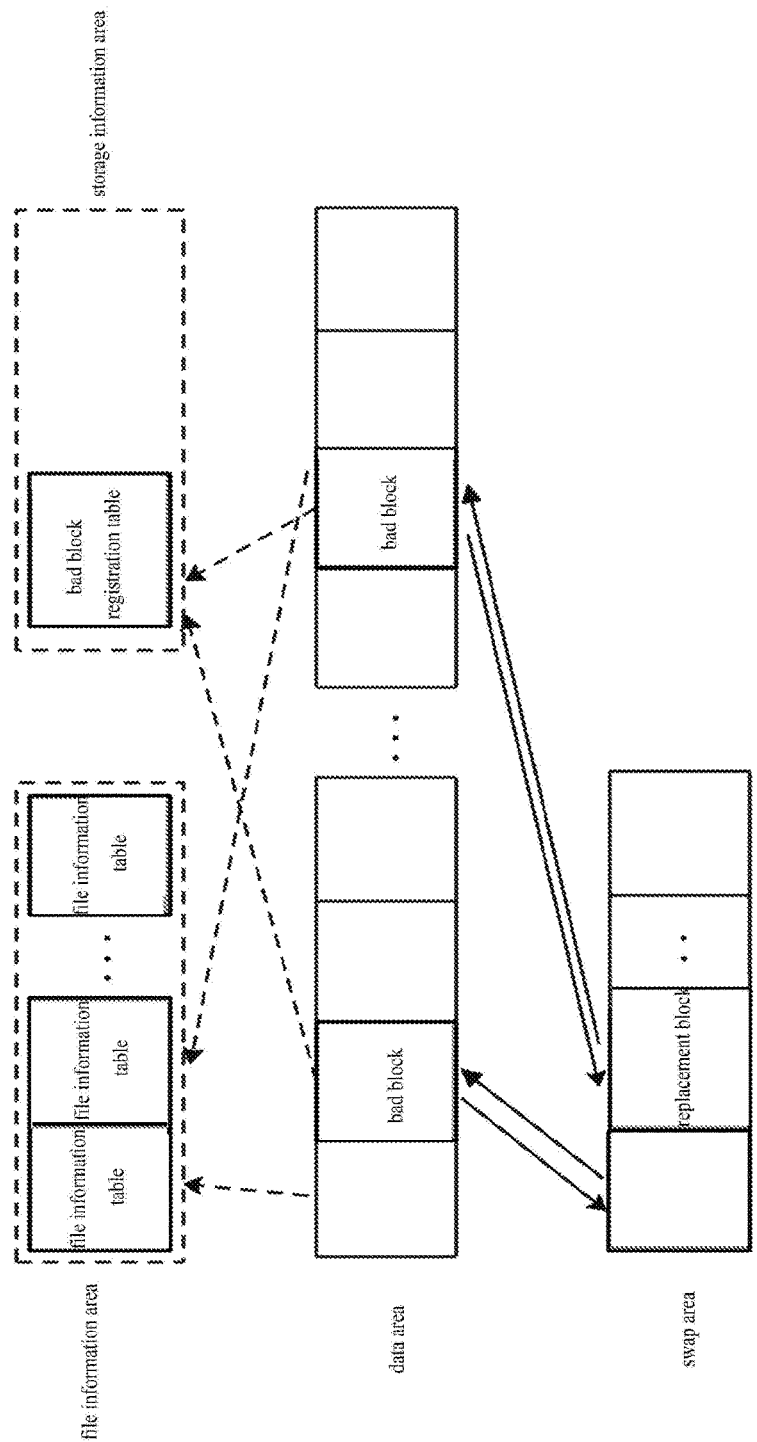
FIG. 3 is a schematic structural diagram showing a storage area of the present invention.

As shown in FIG. 3, the physical storage space of the NandFlash memory is divided into a storage information area, a file information area, a data area and a swap area;

the storage information area is configured to store a bad block registration swap table and is located behind the file information area, wherein the information storage area is divided into a plurality of small blocks, each of which can store a piece of completely stored information and is used in turn;

the file information area is configured to store a bad file information table and is located in the first several blocks of a physical address of the memory, wherein the file information area is internally divided into a plurality of small blocks, each of which can store a piece of complete file information and is used in turn;

the data area is configured to store a data content itself and is located in the middle of the physical address of the memory; and the swap area is configured to swap a bad block and is located in the last several blocks of the physical address of the memory, wherein if a certain block in the data area can not be written, it is replaced with a block in the swap area.

Figure 4:
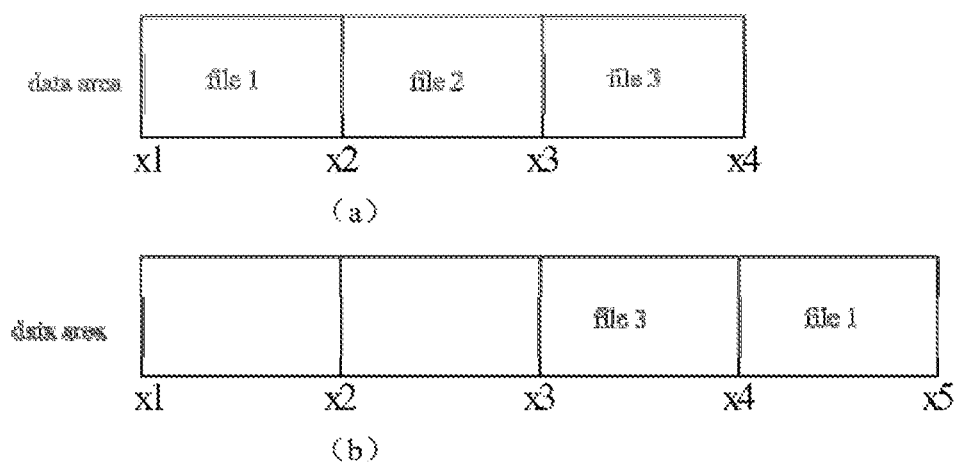
FIG. 4 is a block diagram showing a file movement logic of the present invention.

As shown in FIG. 4(*a*), the method further includes a file deletion operation, the file deletion operation is to delete the record of the to-be-deleted file in information file information table, and if there are files stored in front of the address of the deleted files, sequentially copy those files behind the end starting address of the last file, that is, ensure that area addresses where file contents are stored in the data area are coherent.

As shown in FIG. 4(*b*), the method further includes a file addition writing operation, which continues writing at the tail of the file, and if there are no other files behind the additionally written file, directly continues the writing, and if there are other files behind the additionally written file, firstly executes a file movement process to move the additionally written file to the tail-most end of a used storage space, and then continues the writing at the tail of the file.

While one embodiment of the present invention has been described in detail, the foregoing is merely illustrative of a preferred embodiment of the present invention and is not to be construed as limiting the scope of the present invention. Any changes and modifications made in accordance with the scope of the present application should be within the scope of the present invention.

The invention claimed is:

1. A method of writing data in a wear-leveling NandFlash memory, a storage space of the NandFlash memory including a storage information area, a file information area, a data area and a swap area, the method comprising:

creating a new file information table in the file information area, and reading all other file information tables to determine a writing starting address of a new file;

determining whether the writing starting address of the new file is in a starting address of a block;

in response to the writing starting address of the new file being in the starting address of the block, erasing the block, and determining a return status of an erasure operation;

in response to an error being returned, indicating that the block is a bad block, finding a replacement block in the swap area to replace the bad block, and updating a bad block registration table in the storage information area;

storing to-be-written data into a data buffer of a memory;

in response to data of one page having been stored sufficiently in the data buffer, writing the data into a block in the data area, and determining a return status of the writing;

in response to an error being returned, indicating that the block where this page is located is a bad block, finding a replacement block in the swap area to replace the bad block, updating the bad block registration table in the storage information area, and copying contents of a current page and its previous page of the bad block into the replacement block;

in response to the pages being successfully written, updating the file information table, which comprises file storage starting and ending addresses, file sizes and file updating time;

repeating steps including the storing to-be-written data through the updating the file information table, until a user ends a writing operation;

determining whether any remaining data exists in the data buffer, in response to any remaining data existing in the data buffer, writing all the data remaining in the buffer into a block in the data area; and updating the file information table.

2. The method according to claim 1, further comprising:

deleting information on a to-be-deleted file in the file information table to perform a file deletion operation; and if there are files stored at a location with a higher logical address than the end address of a deleted file, sequentially copying those files at a location with a lower logical address than the starting address of the last file.

3. The method according to claim 1, further comprising:

continuing writing at a tail of the file to perform a file addition writing operation;

if there are no other files at a location with a higher logical address than the end address of an additionally written file, directly continuing the writing, and; and if there are other files at a location with a higher logical address than the end address of the additionally written file, firstly executing a file movement process to move the additionally written file to the tail-most end of a used storage space, and then continuing the writing at the tail of the file.

4. The method according to claim 1, wherein the storage information area is configured to store a bad block registration swap table and is-divided into a plurality of blocks, each of which is used in turn;

wherein the file information area is configured to store information on bad blocks in the file information table and is located in the first several blocks of a physical address of the memory, the file information area being internally divided into a plurality of blocks, each of which is used in turn;

wherein the data area is configured to store data and is located in the middle of the physical address of the memory; and wherein the swap area is configured to swap a bad block in the data area with a replacement block in the swap area and is located in the last several blocks of the physical address of the memory, the bad block being a block in the data area to which data cannot be written.

5. The method according to claim 4, wherein information on the bad block is stored in the plurality of blocks in the storage information area, which is used in turn.

6. The method according to claim 1, further comprising:

reading a file information table in the file information area;

determining a starting address and an ending address of a file storage according to the file information table;

in response to the starting address being an address of a block that has not been previously written to, determining whether a to-be-read block is a bad block;

finding an address of a replacement block of the bad block in response to the to-be-read block being the bad block;

in response to the starting address not being an address of a block that has not been previously written to, reading a page of data once;

determining whether all the files are read according to the file information table;

in response to all the files not being read, determining whether contents of blocks of all the pages are read;

in response to the contents of blocks of all the pages not being read, continuing to perform reading a page of data once with an increased page address by 1; and in response to the contents of blocks of all the pages being read, continuing to perform determining whether a to-be-read block is a bad block with an increased block address by 1.

* * * * *